UNITED STATES PATENT OFFICE.

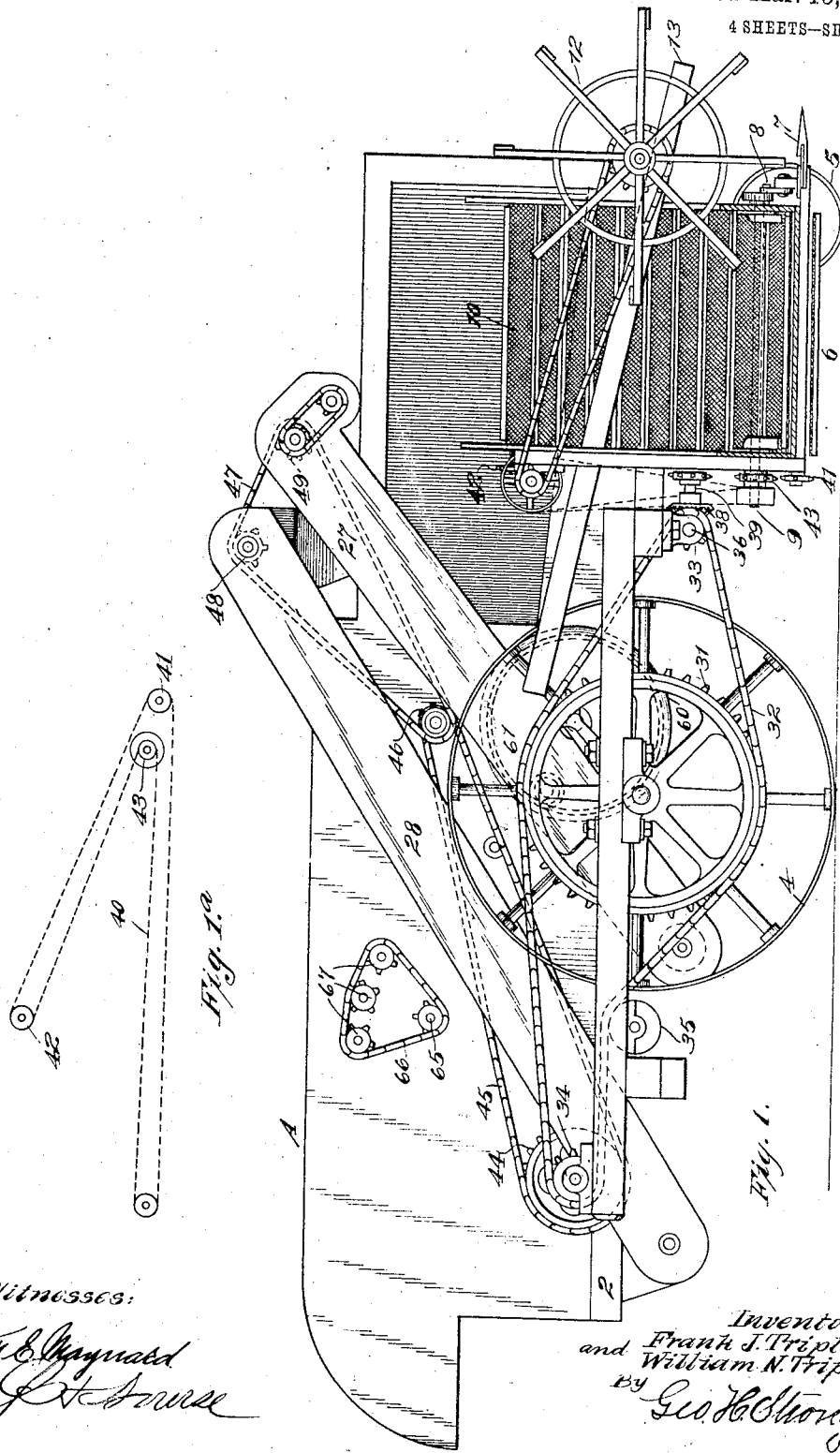

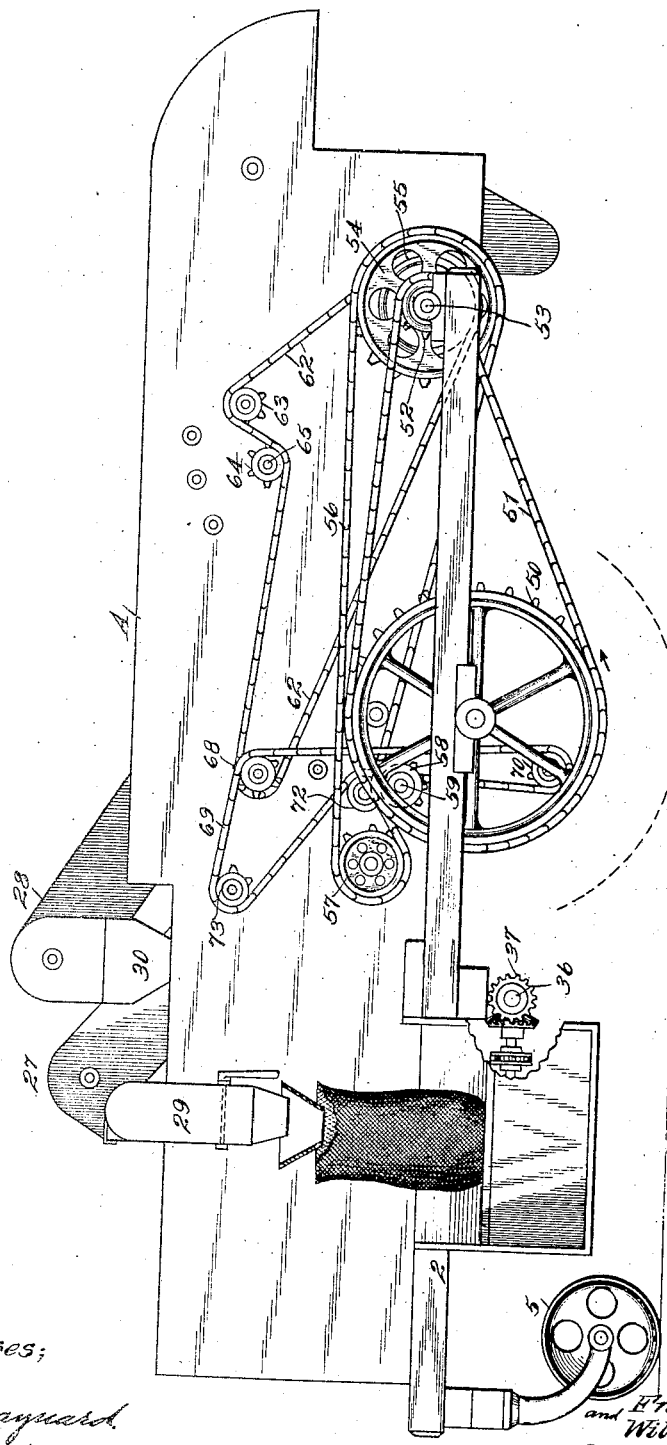

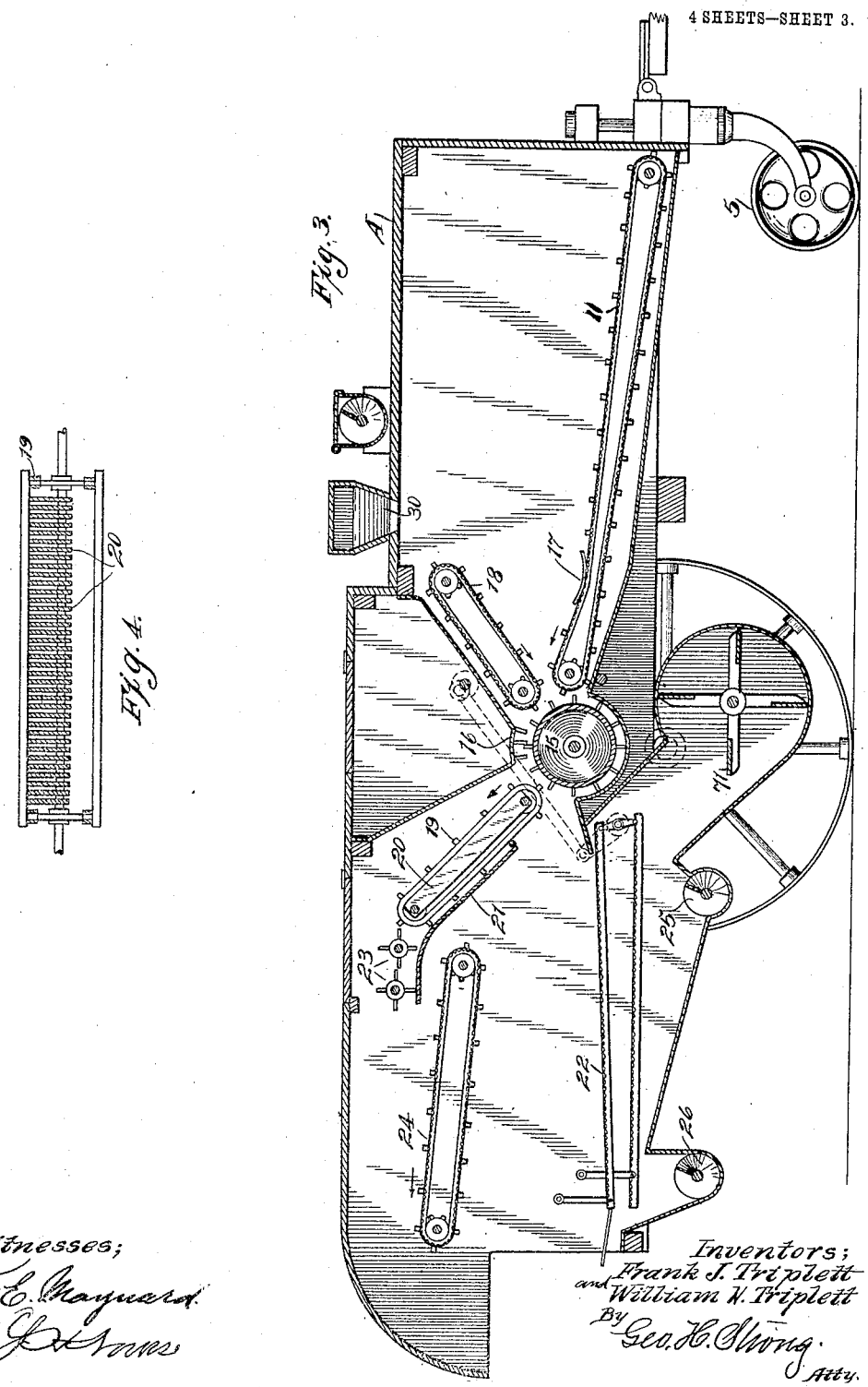

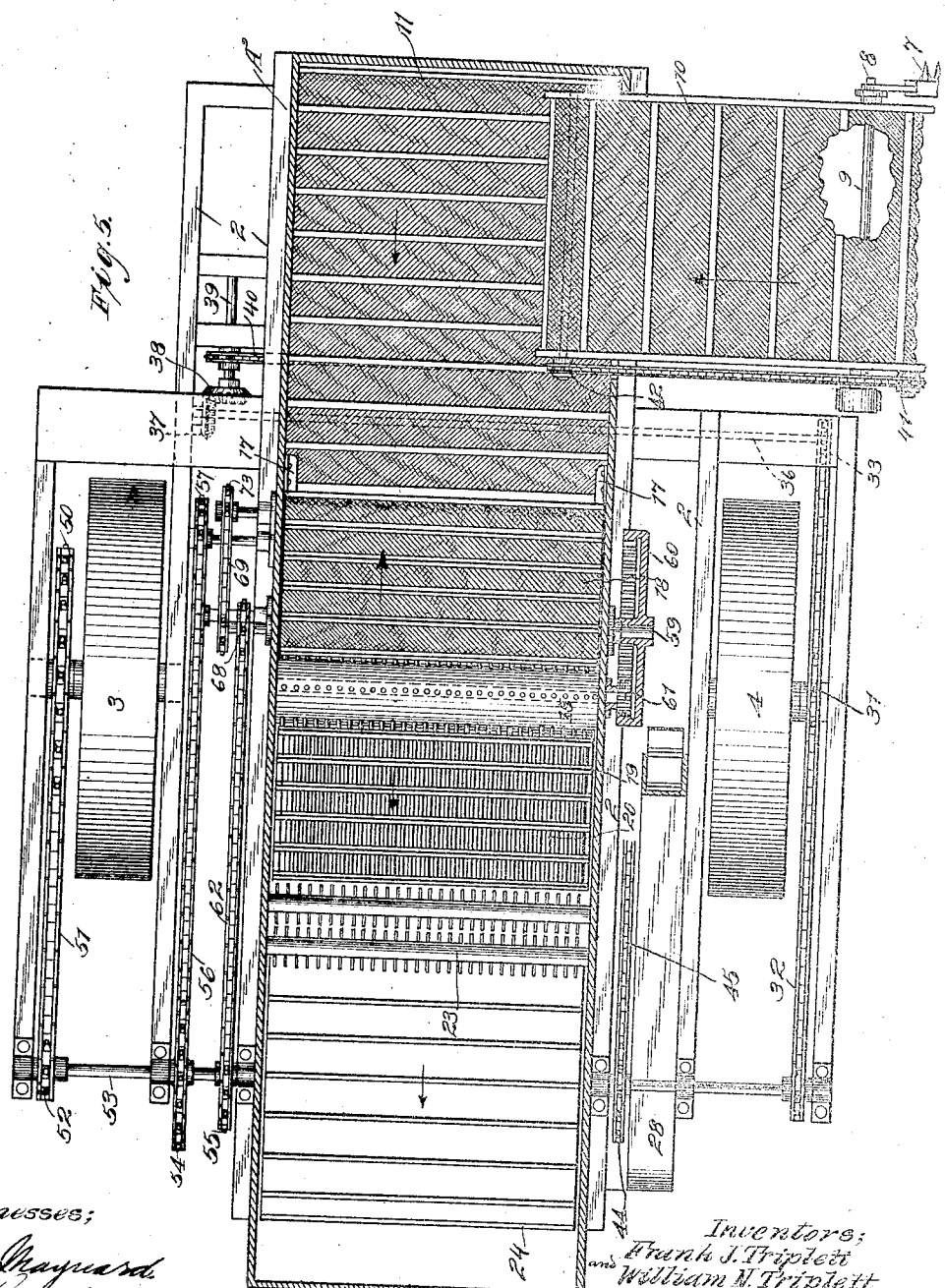

FRANK J. TRIPLETT AND WILLIAM N. TRIPLETT, OF MAXWELL, CALIFORNIA.

HARVESTER.

952,384. 	Specification of Letters Patent. 	Patented Mar. 15, 1910.

Application filed February 14, 1908. Serial No. 415,839.

*To all whom it may concern:*

Be it known that we, FRANK J. TRIPLETT and WILLIAM N. TRIPLETT, both citizens of the United States, residing at Maxwell, in the county of Colusa and State of California, have invented new and useful Improvements in Harvesters, of which the following is a specification.

Our invention relates to improvements in combined harvesters.

It consists in the combination and arrangement of parts and in details of construction which will be more fully explained by reference to the accompanying drawings, in which—

Figure 1 is an elevation of our machine viewed from the header side. Fig. 1ª is a separate view of the header and draper driving mechanism transverse to Fig. 1. Fig. 2 is a side elevation of the machine from the opposite side to Fig. 1. Fig. 3 is a longitudinal vertical section corresponding to Fig. 1. Fig. 4 is a transverse section of a grain and straw separating riddle. Fig. 5 is a plan view of the apparatus.

It is the object of our invention to provide an improved apparatus for harvesting grain, including the cutting, transferring from the sickle to the threshing cylinder, threshing, separating the threshed straw and grain, delivering the grain to cleaning screens, and discharging the straw, and so constructing these parts that the machine may be very much shortened, the weight brought more completely upon the main bearing wheels, from which power is derived to drive the machinery and in the location of the threshing cylinder approximately in line above the bearing-wheel shafts; and in such general economy of the driving chains as to greatly reduce their length with a consequent improvement in their maintenance and wearing qualities.

As we have here shown, the exterior casing A is mounted upon the timbers 2 which are framed together in the usual or any suitable manner to provide a bearing for the different parts of the apparatus. The transverse timbers of the frame extend upon each side of the main frame, and form openings within which the bearing and driving wheels 3 and 4 are journaled and turnable. In the present drawing, these wheels are shown with plain surfaces, but it will be understood that they may be provided with raised plates, termed "grousers" to insure a sufficient traction to prevent the wheels from slipping, and to insure motion being transmitted to drive the various parts, depending upon the motion of these wheels. The main portion of the weight is so balanced upon these bearing-wheels that they will be most effective in developing and transmitting the necessary power. The front end of the machine is carried upon the caster-wheel 5 which is readily turnable to follow the movements of the machine as it is swung from one side to the other, and we are enabled to dispose with the heavier wheels and the horizontal circles in which such wheels are usually turnable thus considerably reducing the expense of the apparatus, and increasing the convenience of its operation. The header so-called projects from the right side, near the front of the machine (only a small portion of it is shown as at 6); and the sickle travels in the usual sickle guard as at 7, and is reciprocated by a crank 8 upon a shaft 9. The elevating draper 10 extends upwardly at an angle from the inward end of the header, and carries the grain upwardly and delivers it into the feed-house at the front end of the casing A, where it falls upon an endless traveling belt 11, and by this belt is delivered to the threshing cylinder. The reel 12 journaled above the front portion of the header, serves to sweep the grain inwardly to the sickle, in the usual manner, and it is mounted upon a tiltable frame or arms as at 13, by which it may be raised or depressed to suit the height and character of the grain to be cut. These devices do not materially differ from those in common use in this class of mechanism, but it is in the location of the threshing cylinder, the balance of the parts, and the manner of transmitting power to drive the various moving parts that our invention particularly lies.

The cylinder 15 is of the usual or any suitable type journaled and revoluble nearly in line vertically above the line of the bearing-wheel shafts, and the concave, so-called, which consists of a series of teeth between which the teeth of the cylinder revolve, and through which the straw is carried to break up the heads and separate the grain therefrom, is located above the cylinder, as shown at 16. The carrying-belt 11 upon which the straw is delivered from the header is thus made of considerable length from the front back to the center of the machine. The upper portion of it passes below guide-plates 17 projecting over each edge so that this upper portion of the belt is turned slightly upward just before it delivers its load to the threshing cylinder. Above the inner end of this belt 11 is a second belt 18, passing around suitable bearing-drums and converging toward the inner end of the belt 11 and the cylinder 15 so that the straw will be regularly and evenly fed to the cylinder, and being carried through the concave 16 by the rapidity of motion and momentum of the cylinder, will be very thoroughly separated. From the cylinder and concave the straw and grain are discharged upon an upwardly and rearwardly inclined traveling belt 19. Between the upper and lower portions of this slat belt 19 are disposed vertical plates 20 which form a riddle or grizzly, the plates forming this device being sufficiently separated so that grain may pass between them, and falling upon the direction-board 21 the grain will be delivered upon the front end of the uppermost of the screens 22, upon which the grain is cleaned in the usual manner.

23 are pickers, so-called, over which the straw is lifted as it passes over the upper end of the belt 19, and being thus loosened most of the remaining grain will be separated therefrom, and carried to the cleaning shoe.

24 is an open slat straw-carrying belt upon which the straw is received, and if there still remains any grain, it will fall through this belt and upon the screens which are located below it, the straw being delivered out at the rear end of the machine in the usual manner.

The grain passing through the screens is received and transferred to one side of the machine by a revoluble grain-carrying auger 25, and the tailings are discharged from the outer rear end of the machine, and are received and transported in like manner by an auger 26. These augers deliver the grain to endless traveling elevators within the cases 27 and 28 respectively, one carrying the grain to a point where it will be delivered through a chute 29 to the sacking device, plainly shown in Fig. 2; the other returns any unthreshed heads and delivers them into a hopper or chute 30, from which they are again passed to the cylinder, and subjected to a second threshing.

Power is transmitted to drive this mechanism as follows: Upon the right side of the machine, and connected with the wheel 4 is a sprocket-wheel 31. A sprocket-chain 32 passes over this wheel, both above and below, converging forwardly over a small sprocket-wheel 33, and at the rear end it converges over another sprocket-wheel 34, the lower portion of the chain passing also over an idler 35 located between the main driving sprocket 31, and the sprocket 34 so that by reason of the smaller diameter of the two sprockets 33—34, and the interposition of the idler 35, the chain 32 is caused to wrap far enough around the driving sprocket 31 to insure power being transmitted to the chain sufficient for all purposes to which it will be subjected. The sprocket 33 is mounted upon a shaft 36 which extends transversely across the machine to the opposite side, and is provided at this opposite end with a bevel-pinion 37 which engages a corresponding pinion 38 upon a longitudinally journaled shaft 39. Upon this shaft is a sprocket-pulley around which passes a chain 40, and this chain extends across to the right side of the machine to drive the header mechanism. At this point it passes around a pulley 41, thence upwardly over a pulley 42 mounted upon a shaft at the upper end of the elevator draper, and through this it drives the draper 10 so as to deliver the grain from the sickle to the thresher as previously described; thence passing backwardly and around a sprocket-pulley 43, it returns to the sprocket upon the shaft 39 at the opposite side of the machine. The sprocket 43 is mounted upon a shaft 9 which, as previously described, imparts motion to the sickle. Thus all this mechanism is driven by a single chain. The object in first transferring the power from the right to the left side of the machine, then returning it through the long sprocket-chain, is to make this chain so long that the movements of the header mechanism, when it is raised or depressed to cut high or low grain, will have little or no effect in lengthening or shortening the driving-chain, since the arc of movement at that end is so slight that the chain will substantially maintain its tension whatever change may take place in the position of the vertically movable parts.

The rear sprocket 34 around which the main chain 32 passes is mounted upon a shaft which carries a sprocket-wheel 44 upon its inner end and near to the side of the machine casing. Around this sprocket-wheel passes a chain 45, thence around a sprocket-wheel at 46. Upon the shaft of this wheel 46 is another sprocket around which passes a chain 47. This chain passes over sprockets upon the shafts 48 and 49 respectively, of the elevators, thence returning to the sprocket on the shaft 46, and through this chain both the elevators are driven. Upon the opposite side of the machine, and driven by the wheel 3, is a sprocket-wheel 50, around which passes a chain 51, extending thence to a sprocket-wheel 52 mounted upon the shaft 53; this shaft being journaled upon the outer timber of the wheel-frame, and upon the main timber which supports the threshing machine proper. This shaft 53 carries two sprocket-wheels 54 and 55. From one of these sprockets a chain 56 passes around an idler 57, thence over a sprocket-wheel 58 enveloping the sprocket sufficiently to transmit the necessary power to drive it. The shaft 59 of this sprocket returns across the machine to the right side, and has fixed upon it at that side, an internal gear 60. The shaft of the threshing cylinder 15 carries a pinion 61 which engages with the internal gear 60, as plainly shown in Figs. 1 and 5, and through this transmission power is applied to drive the threshing cylinder. From the remaining sprocket, which is mounted upon the shaft 53, a chain 62 passes over an idler 63; thence beneath a sprocket 64 which is mounted upon a shaft 65 plainly shown in Fig. 2. This shaft carries a sprocket-wheel through which power is transmitted through chain 66 to drive the sprocket-wheels 67, and through these the pickers 23; the straw-carrying belt 24 is also driven through the same shaft 65. The chain 62 continuing passes around a sprocket-wheel 68; thence returning to the sprocket on the shaft 53. Upon the same shaft with the sprocket 68 is another sprocket around which passes a chain 69; thence this chain passes around a sprocket at 70 mounted upon the fan-shaft, and through which power is transmitted to drive the fan 71; thence passing upwardly over a sprocket at 72, the chain passes around another sprocket 73 through which power is transmitted to drive the feeder belt 18. Sprocket 72 drives the feed belt 11.

By the construction here shown and described, we are enabled to shorten the length of the main driving-chains very considerably and thus prevent the vibration which occurs with long chains, and which, when they are heavy, is very objectionable. By the location of the cylinder substantially in line above the axial line of the bearing-wheels, we place this heavy weight with its high velocity and momentum in the best possible position to relieve the machine from undue vibration and at the same time to concentrate a greater proportion of the weight on the bearing-wheels to increase their tractive effect.

Another important advantage in this position of the cylinder is in bringing its shaft bearings in the vertical plane passing through the bearings of the main wheels, and as the frames of such machines twist more or less in passing over inequalities of the ground, it will be understood that if the cylinder shaft is placed at any considerable distance away from the bearing-wheels as is usually the case, its boxes will be subjected to these twisting movements; but where it is placed in line above the wheel-shafts, these, forming the center about which movement takes place, the cylinder would be subjected to a minimum of distortion-producing movements. The revolution of the cylinder is backwardly by reason of the concave being placed above it, and this revolution in the opposite direction from the travel of the machine, helps to balance the front portion of the machine instead of causing it to bear down heavily upon the steering-wheel 5. The balance of the machine, constructed as herein described is so perfect that one or two men, can readily raise the front of the machine from the ground, tilting it upon the bearing-wheels, and when the machine is running, the increase of pressure upon the ground at the front, is just sufficient to allow a man to move about and toward the rear of the machine, without actually lifting the front from the ground.

The compactness of this machine enables us to greatly shorten the projecting front, and make it so much less than in the ordinary construction of harvesters, that we are enabled to mount the header mechanism at right angles with the threshing machine case, instead of carrying the outer end of the header backwardly from the front. We are thus enabled to turn square corners with the machine, with a full cutting effect, and to deliver the cut grain at right angles upon the carrying belt 11 instead of throwing it up into the front corner of the machine as results from the diagonal disposition of the header.

While the caster-wheel is shown upon the front of the machine, it should be understood that it may be attached to the tongue of the machine, if found desirable.

Having thus described our invention, what we claim and desire to secure by Letters Patent is—

1. A combined header and separator including a header mechanism, a frame, centrally located main traction wheels, and a front automatically turnable caster wheel, a threshing cylinder journaled substantially in the vertical plane passing through the axis of the main bearing-wheels, and having a superposed coacting concave, sprocket-wheels and transmitting chains, said sprockets being so disposed that the motion of one of them is reversed with respect to another and an internal gear and pinion whereby said reverse motion is transmitted to the threshing cylinder.

2. A combined header and separator comprising a main frame, centrally located bearing-wheels, and an automatically turnable front caster-wheel upon which the frame is borne, a sprocket-wheel carried by the right bearing-wheel, a sprocket-pinion, a header and chains through which motion is transmitted to drive the header, a second sprocket-wheel carried by the left hand bearing-wheel, sprocket-pinions and connecting chains whereby the motion of one of said sprocket-pinions is reversed with respect to another, an internal gear and a shaft by which said sprocket-wheel is connected with said gear upon the right side of the machine, a threshing cylinder and a pinion upon the threshing cylinder shaft whereby said cylinder is revolved in a direction opposite to that of the bearing wheels, said cylinder being disposed in a vertical plane passing through the axis of the main bearing-wheels, and a concave disposed above said cylinder and co-acting therewith.

3. In a combined harvester of the character described, a threshing and cleaning mechanism, bearing and traction wheels upon which the threshing apparatus is centrally supported, a caster-wheel supporting the front end of said apparatus, a header frame hinged to and extending to one side of the thresher, carrying belts by which the unthreshed straw is delivered to the threshing cylinder, a header mechanism, including a sickle, a carrying draper and a reel, means by which power is transmitted to drive the header mechanism, said means including a sprocket-wheel driven by the right-hand traction wheel, a chain engaging the upper and lower surfaces of said sprocket, a sprocket-pinion in front of the driver around which the chain passes, a shaft upon which said pinion is mounted, said shaft extending across to the opposite side of the machine, a sprocket pulley, the shaft of which is journaled upon said opposite side of the machine, a chain extending from said sprocket to the right side of the machine, pulleys around which said chain passes to respectively drive the sickle, the carrying draper and the reel of the header.

4. A combined header and separator including a main frame, bearing-wheels journaled substantially midway between the ends of said frame, an automatically turnable caster-wheel by which the front of the frame is supported, a flexibly connected header mechanism projecting from the front of the main frame, a sprocket-wheel carried by the right hand bearing-wheel, a sprocket-pinion and a connecting chain, a shaft upon which the pinion is mounted extending to the opposite side of the main frame, a shaft at right angles with said sprocket shaft, bevel gears by which motion is transmitted thereto, and a chain extending from said shaft across to the right of the machine, sprockets and mechanism through which the motion is transmitted by said chain to drive the header mechanism, and allow independent movements thereof.

5. A combined header and separator including a main frame, centrally located bearing-wheels upon each side, and an automatically turnable caster-wheel at the front, sprocket-wheels carried by each of the bearing-wheels, a threshing cylinder with superposed concave, said cylinder being located in the vertical plane passing through the axis of the bearing wheels, separating mechanism carried upon the main frame, means transmitted from the left bearing-wheel by which the threshing cylinder is revolved in a direction opposite to the movement of the bearing wheels, a flexibly connected header carried upon the opposite side of the main frame, and sprocket-wheels and chains through which power is transmitted from the right bearing-wheel to drive the header mechanism.

6. A combined header and separator including main and header frames flexibly connected together, centrally located bearing and traction wheels, and a front wheel upon which the main frame is carried, sprocket-wheels and a main driving-chain upon one side of the machine through which the header mechanism is driven, sprocket-wheels and driving chains upon the opposite side of the machine, a threshing cylinder located in the vertical plane passing through the axis of the main wheels, a superposed concave, and intermediate mechanism through which the threshing cylinder is given a movement in the reverse direction to that of the bearing wheels.

7. A combined header and separator including flexibly connected main and header frames, centrally located main bearing and traction wheels, and a wheel upon which the main frame is carried, sprocket-wheels, driving chains and gears through which power is transmitted to propel the cutting mechanism, a threshing cylinder and superposed concave upon the main frame, said cylinder being located in the vertical plane passing through the axis of the main wheels, other sprocket-wheels and chains through which power is transmitted from the left hand bearing wheel, and intermediate means by which the threshing cylinder is revolved in the reverse direction to that of the bearing wheels.

8. In a combined harvester of the character described, main and header frames hinged together, centrally located main bearing and traction wheels, and a front-wheel upon which the main frame is carried, sprocket-wheels and main driving-chains through which power is transmitted to propel the cutting and threshing mechanism, said main chains being driven from the bearing-wheels, a threshing cylinder with connections by which it is driven from one main chain, said cylinder being located in the vertical plane passing through the axis of the main wheels, and a superposed co-acting concave, and connections by which the cutting mechanism is driven by the other main chain.

In testimony whereof we have hereunto set our hands in presence of two subscribing witnesses.

FRANK J. TRIPLETT.
WILLIAM N. TRIPLETT.

Witnesses:
GEO. L. HARDEN,
GEO. B. HARDEN.